United States Patent
Gordeev et al.

[11] Patent Number: 6,083,614
[45] Date of Patent: Jul. 4, 2000

[54] METHOD OF PRODUCING A COMPOSITE, MORE PRECISELY A NANOPOROUS BODY AND A NANOPOROUS BODY PRODUCED THEREBY

[75] Inventors: Sergey Konstantinovitch Gordeev; Sergey Germanovich Zhukov; Peter Ivanovietc Belobrov; Andrej Nicolajvietc Smolianinov; Juri Pavlovietc Dikov, all of St. Petersburg, Russian Federation

[73] Assignee: Alfar International, Inc., Dublin, Ireland

[21] Appl. No.: 09/043,947

[22] PCT Filed: Sep. 27, 1996

[86] PCT No.: PCT/SE96/01216

§ 371 Date: Jun. 1, 1998

§ 102(e) Date: Jun. 1, 1998

[87] PCT Pub. No.: WO97/11923

PCT Pub. Date: Apr. 3, 1997

[30] Foreign Application Priority Data

Sep. 27, 1995 [RU] Russian Federation ............. 95116683

[51] Int. Cl.[7] ....................................................... B32B 5/22
[52] U.S. Cl. .................................... 428/317.9; 428/312.8; 423/446; 427/79; 427/80; 427/249; 427/249.2; 427/249.5; 427/535

[58] Field of Search ................................ 423/446; 427/80, 427/79, 249, 535, 249.2, 249.5; 51/295; 501/90; 428/312.8, 317.9

[56] References Cited

U.S. PATENT DOCUMENTS 5,527,747 6/1996 Lackey, Jr. et al. ....................... 501/90
5,876,787 3/1999 Avarbz et al. ............................. 427/79

*Primary Examiner*—Steven P. Griffin
*Assistant Examiner*—Christina Ildebrando
*Attorney, Agent, or Firm*—Flehr Hohbach Test Albritton & Herbert LLP

[57] ABSTRACT

The present invention is related to a method of producing a nanoporous body containing nanodiamonds and having a desired shape, comprising the steps of: forming an intermediate body having the desired shape of nanodiamond particles having a maximum size of 10 nm, exposing said body to a gaseous hydrocarbon or a mixture of hydrocarbons at a temperature exceeding the decomposition temperature for the hydrocarbon or the hydrocarbons. In accordance with the invention the intermediate body is formed with a porosity of 50–80 vol. %, and during the heat treatment of the intermediate body with hydrocarbon or hydrocarbons, the mass of the body is increased by 50% at the most. The present invention also relates to a nanoporous body produced by the method and to uses of such a body.

11 Claims, 2 Drawing Sheets

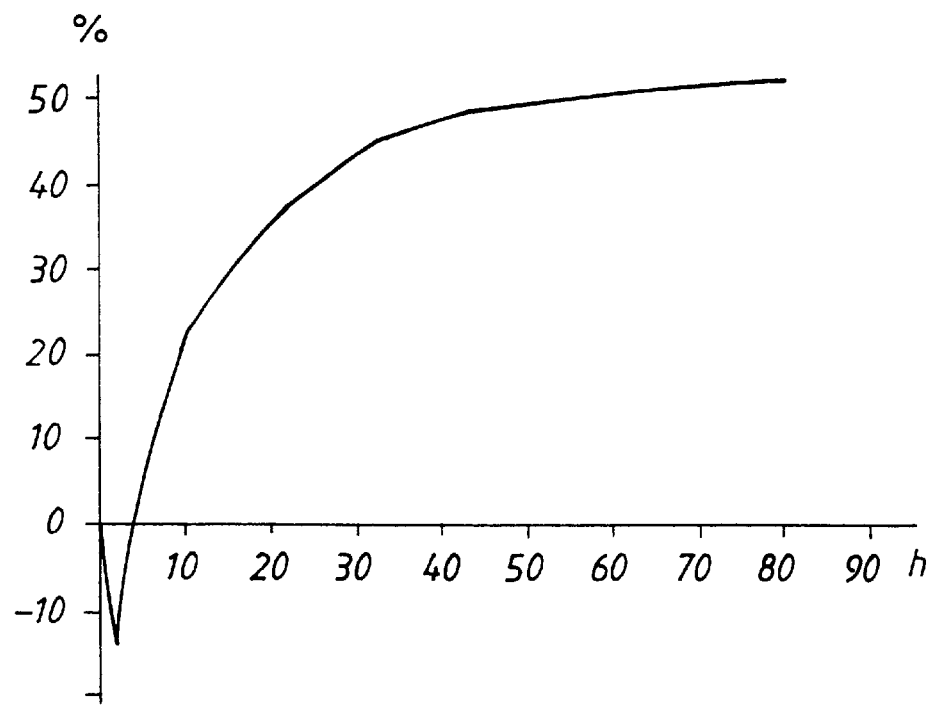
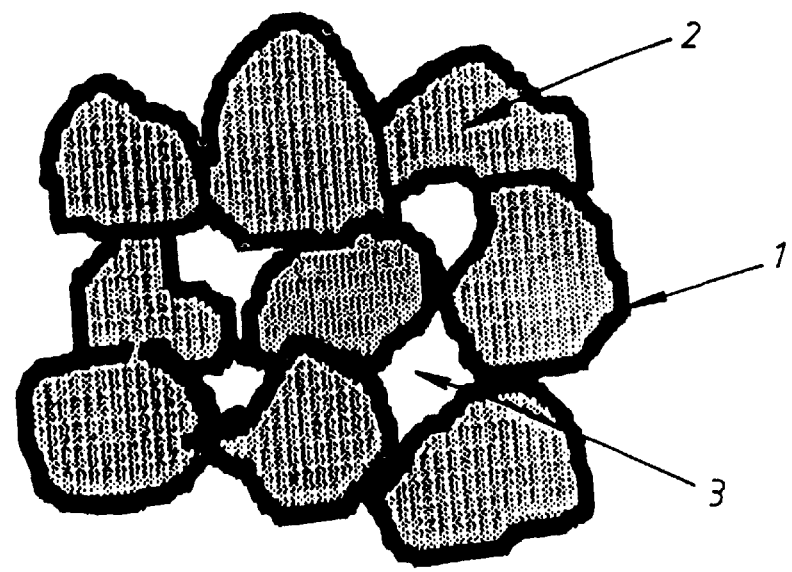

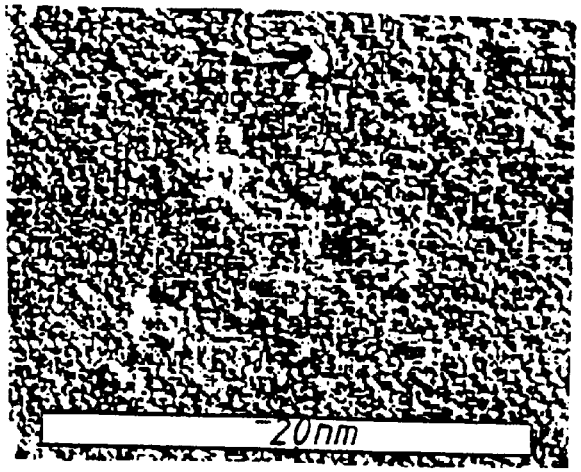

METHOD OF PRODUCING A COMPOSITE, MORE PRECISELY A NANOPOROUS BODY AND A NANOPOROUS BODY PRODUCED THEREBY

The present invention relates to a method of producing a composite, more precisely a nanoporous body containing nanodiamonds and having a desired shape, comprising the steps of forming an intermediate body having the desired shape of nanodiamond particles having a maximum size of 10 nm, and exposing said body to a gaseous hydrocarbon or a mixture of hydrocarbons at a temperature exceeding the decomposition temperature for the hydrocarbon or the hydrocarbons. The invention also relates to a nanoporous body produced by said method and uses of such a body.

The term "nanodiamonds" in the present application refers to diamonds, also known as ultradispersed diamonds (UDD), which can be produced by dynamic methods of applying shock waves. The extremly small dimensions of the nanodiamond particles of maximum 10 nm provide unique physical and chemical properties. However, these small dimensions prevent application of these diamond powders in the traditional diamond fields of usage; grinding and cutting tools, heat-conducting devices, etc. Thus, there is a problem to create compact engineering materials on the base of nanodiamonds.

From "Kompozitsionnyie materialy ultradispersnyie almazypirouglerod", by S. K Gordeev et al. in "Neorganicheskiie materialy", 1995, T. 31, # 4, pp. 470–474, a method of producing a composite material comprising nanodiamonds and pyrocarbon is known. This method comprises the steps of forming an intermediate product by pressing diamond powder, the particles therein having a maximum size of 10 nm, and subsequent thermal treatment in hydrocarbon medium at a temperature higher than the temperature of thermal decomposition of said medium in order to increase the mass of the intermediate product by more than 50%. In the course of the treatment the diamond grains are bonded together into a carbon composite in which the major component is carbon.

By this method a compact material is obtained and this nanodiamond-pyrocarbon material combines a nanodiamond filling and a carbon matrix. The carbon bonding layer will have a thickness of several nanometers, the pore size in this material being very small. In such a material the mass ratio of the carbon matrix to diamond filling exceeds 0.8 and the volume of the open pores constitutes only 10% of the total volume of said material. A material having such a small volume of open pores and a low value of specific surface has low adsorption and ion exchange properties. Moreover, the high mass content of pyrocarbon in the material makes it unsuitable to use as a base material for producing diamond materials or as a substrate for growing diamond coatings.

The object of the invention is to create a nanoporous body having good adsorption and ion exchange properties and a low content of pyrocarbon skeleton in order to obtain a nanocomposite material suitable for use in several technical areas, such as a sorption material, an active adsorbent of metal ions in solutions, a purifying membrane, electrodes in double electric layer capacitor and a substrate for growing diamond films and a base material for preparing diamond crystals or diamond containing ceramics.

This object is accomplished by a method of producing a nanoporous body containing nanodiamonds and having a desired shape, comprising the steps of, forming an intermediate body having the the desired shape of nanodiamond particles having a maximum size of 10 nm, exposing said body to a gaseous hydrocarbon or a mixture of hydrocarbons at a temperature exceeding the decomposition temperature for the hydrocarbon or the hydrocarbons, characterized in that the intermediate body is formed with a porosity of 50–80 vol. %, and in that during the treatment of the intermediate body with hydrocarbon or hydrocarbons the mass of said body is increased by 50% at the most. Thereby a nanoporous body with a large specific surface and a low mass ratio of carbon skeleton to nanodiamonds is obtained. Such a body has good adsorption and ion exchange properties and permits, due to the optimal ratio of carbon skeleton to nanodiamonds, a use of the body as a substrate for growing diamond films and for synthesizing diamond materials.

In a preferred embodiment the forming of the intermediate body is made by pressing.

In another embodiment the forming of the intermediate body is made by slip or slurry casting or by applying a diamond slip on the surface of a heat-proof support. A diamond slip with a concentration of 3 to 40 weight % of nanodiamonds therein is used.

The invention also relates to a nanoporous body comprising nanodiamond particles having a maximum size of 10 nm, a pyrocarbon skeleton and open pores, which is characterized in that the ratio of the mass of the pyrocarbon skeleton to the mass of the nanodiamond particles does not exceed 0.8.

In a preferred embodiment the volume of open pores constitutes more than 10% of the volume of the body.

The invention furthermore relates to the use of a nanoporous body comprising nanodiamond particles having a maximum size of 10 nm, a pyrocarbon skeleton and open pores, in which the ratio of the mass of the pyrocarbon skeleton to the mass of the nanodiamond particles does not exceed 0.8, as an electrode in a double electric layer capacitor, as a substrate for synthesizing of diamond films and as base material for synthesizing of diamond crystals or diamond ceramics.

The invention will now be described with reference to the enclosed drawing, in which;

FIG. 1 shows a calibration curve for the thermal treatment of an intermediate body according to example 1, and FIG. 2 schematically shows the structure of a nanoporous body according to the invention, and FIGS. 3 and 4 show magnified views in different magnifications taken from above of a diamond film grown on the surface of a nanoporous body according to the invention.

The method according to the invention comprises the following steps.

At first an intermediate body having the desired shape of the end product, i.e. the desired shape in a macroscale, is formed of nanodiamond powder, the particles thereof having a maximum size of 10 nm (nanometers). The formation is made by pressing, when needed a temporary binder, such as ethyl alcohol or aqueuse solution of polyvinyl alcohol, is used, so that the intermediate body after the formation has a porosity of 50 to 80 vol. %. The formation can also be made by slurry casting in molds or on a surface of a heat-proof support.

Thereafter, the formed intermediate body is placed in a reactor and heat-treated in a gaseous hydrocarbon or in a mixture of hydrocarbons at a temperature that is higher than the temperature, at which the hydrocarbon or the hydrocarbons decompose. During this treatment a chemical reaction takes place on all surfaces accessible to the gas agent and a carbon skeleton binding the nanodiamonds together in the intermediate body is formed. The heat-treatment is to be carried on for as long as it takes to get the desired bonding, the desired quantity of carbon skeleton in the body and the desired porosity. However, the mass of the carbon skeleton should not exceed 50% of the mass of the nanodiamonds in the intermediate body.

By this method a nanoporous body with a high porosity and high capillary effect is produced. In FIG. 2 the structure of a part of such a body is schematically shown. As is evident from this Figure a carbon skeleton 1 has been formed on all surfaces of the nanodiamond particles 2, which were accessible to the gaseous hydrocarbon during the heat-treatment. Moreover, due to the porosity of the intermediate body and the ending of the heat-treatment before the mass of the carbon skeleton exceed 50% of the mass of nanodiamonds in the body, a significant amount of nanopores 3 are present in the composite body. It is also pointed out that although the shape of the intemediate body is somewhat changed in the microscale of FIG. 2 the composite end body produced by the abovementioned method has the same shape as the intermediate body when regarded in a macroscale.

The nanoporous body shown in FIG. 2 has good adsorption and ion-exchange properties. Moreover, it has an optimal ratio of carbon skeleton mass to diamond mass, not exceeding 0.8, which makes it possible to use such a body for synthesizing diamonds from said material using conditions where diamond is thermodynamically stable. It is also appropriate to use such a body as substrate for the production of diamond surfaces (films), the nanodiamond grains on the surface of the body serving as initiators enhancing the growth rate of the diamond film. FIGS. 3 and 4 show magnified views from above of a diamond film grown on the surface of a nanoporous body according to the invention, the degree of magnification indicated by length marks in lower parts of the Figures. As is evident from those Figures the diamond film on such a substrate is very fine-grained and smooth. Furthermore, such diamond films have an excellent adhesion to the substrate.

The following examples demonstrate several aspects of the invention.

EXAMPLE 1

An intermediate body having a diameter of 20 mm and a height of 1 mm and a porosity of 66% were formed from nanodiamond powder under a pressure of 30 to 200 MPa. Thereafter, the obtained intermediate body was placed in an isothermic reactor. A pyrocarbon skeleton was formed in the intermediate body from natural gas at a temperature of 730 to 740° C. in accordance with the chemical reaction;

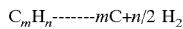

$C_mH_n \text{-------} mC + n/2\ H_2$

The intermediate body is to be treated for the time necessary to increase its mass by 20 weight %. The duration of the treatment was determined by the calibrating curve shown in FIG. 1. In this Figure the mass alteration of an intermediate body with a porosity of 66% and exposed to a flow of natural gas having a temperature of 735° C. is shown as a function of time. The mass alteration is expressed in percent of the mass of the intermediate body before the heat-treatment, the intermediate body being weighed at room temperature. As is evident from FIG. 1, the weight of the intermediate body is decreased in the initial stage of the heat-treatment, probably due to outgassing. For the intermediate body of this example the treatment time was 10 hours and the body was accordingly taken out of the reactor after this time. The basic properties of the obtained composite body were; a porosity of 40 vol. %, a pore size of 4 nm and a specific surface of 200 m$^2$/cm$^3$. Static adsorption capacity of the composite body by benzene vapour was 0.40 c$^3$/cm$^3$. The ratio of carbon skeleton mass to diamond mass in the composite body was 0.45 and the volume of open pores constituted 40 percent of the volume of the body. When 1 gram of the composite body were kept in a solution containing ions of platinum in a concentration of 5 mg/l, the concentration of the platinum ions were reduced by 75%.

EXAMPLE 2

The method was carried out in the same way as in Example 1. However, ethyl alcohol was used as a temporary binder for the nanodiamond powder. The porosity of the formed intermediate body were 50 vol. % and the thermal treatment lasted for 4 hours. The increase of mass of the intermediate body were 5% and the electrical double layer capacity of the body was 5 F/cm$^3$.

EXAMPLE 3

The method was carried out in the same way as in Example 1. The porosity of the formed intermediate body was 70 vol. % and the thermal treatment lasted for 80 hours. The increase in mass of the intermediate body was 50% and the porosity of the obtained composite body was 10 vol. %.

The body was used as a substrate for diamond film synthese from a mixture CH$_4$+H$_2$ at a temperature of 1050° C. An intensive growing of diamond film on the surface of the body took place, the diamond grains on the surface of the body serving as initiators.

When using slurry casting in accordance with known technique for forming the intemediate body, suspension of the diamond powder in water or in waterless liquid phase (paraffin, for example) in concentrations of 3 to 40 weight % is used as a slip. Such a slip has good fluidity, high sedimentation stability and good mold filling properties. In order to avoid the slip to separate into layers, common stabilizing agents can be used. The saturation limit of the suspension for the diamond powder is to be determined by the capacity of the slip to fill up a mold well enough to form the intermediate body.

The slip is to be prepared by making a suspension by adding diamond powder to to the disperse medium and by subsequent stirring of the suspension in a mixer or vibrating the suspension in a ultra-sound disperser. The casting is, for example, made in a gypsum mold. The obtained porosity of the formed intermediate body is 70 to 80 vol. %.

The casted intermediate bodies are to be heat-treated in gaseous hydrocarbon or a mixture of hydrocarbons at the same temperatures as intermediate bodies produced by pressing.

Thin films or coatings can be produced by dipping a heat-proof support, for example made of a ceramic material, such as SiC, carbon substrate, carbon fibres, etc., into the diamond slurry and a subsequent thermal treatment in hydrocarbon or hydrocarbons at temperatures that are higher than the decomposition temperatures for the hydrocarbons. Coatings of this kind can for example also be produced by spraying or electrophorese deposition of the diamond slurry on the surface of the heat-proof support and subsequent heat-treatment as explained above. With the help of said methods, carbon composite coatings with a thickness of 0.5 to 1 mm have been obtained on surfaces of heat-proof supports.

By the above described embodiments of the inventive method nanoporous composite carbon bodies are created having an open porous structure.

In Table 1 important characteristics of the intermediate body and the composite nanoporous body, obtained after the heat-treatment, are shown for the abovementioned different ways of forming the intermediate body.

TABLE 1

| Intermediate body | | Composite body | | |
|---|---|---|---|---|
| Forming method | Porosity vol. % | Porosity vol. % | Ratio of carbon skeleton to diamond | Open pores volume vol. % |
| Pressing | 50–75 | 10–70 | 0.02–0.8 | 10–70 |
| Slurry casting | 65–80 | 10–70 | 0.10–0.8 | 10–70 |
| Slip casting | 65–80 | 10–70 | 0.10–0.8 | 10–70 |

In Table 2 essential properties of nanoporous composite carbon bodies according to the invention and a carbon composite body produced in accordance with the known method referred to above are shown.

TABLE 2

| Manufacturing method | Sorption capacity by benzene vapour $cm^3/cm^3$ | Double electric layer capacity in 30% $H_2SO_4$ solution, $F/cm^3$ |
|---|---|---|
| Pressing & thermal treatment | 0.7–0.1 | 5 |
| Slurry casting & thermal treatment | 0.7–0.1 | — |
| Slip casting & thermal treatment | 0.7–0.1 | — |
| Known method | 0.062 | <0.5 |

The following method were used to determine the properties:

The sorption capacity by benzene ($C_6H_6$) was determined by keeping a dried sample of the composite in saturated benzene vapour until its mass stopped to change. By the change in the sample mass the volume of the adsorbed benzene was calculated, the density value of liquid benzene being used for the calculation.

The electric double layer capacity was determined by putting two identical composite samples, which were previously saturated with a sulphuric acid solution and equipped with electric contacts, into said solution and by reading the electric capacity in constant current between the contacts. The capacity was correlated with the volume of both samples.

A nanoporous carbon composite body according to the present invention has a high adsorption capacity, electrical conductivity and a large inner surface. Such a body can for example be used as;

an efficient sorption body with a sorption space of up to 0.7 $cm^3/cm^3$ and pore sizes of up to some nanometers, which is important for adsorption of large molecules, an active adsorbent of ions of heavy metals, such as platinum, palladium, etc., in solutions, a membrane to purify biological products and blood as well, an adjustable adsorbent, the electrical conductivity of said body permits the appliance of eletrical potential to the body in order to adjust the adsorption and desorption processes, an electrode in a double electric layer capacitor, the large inner surface of the body permitting such a use, a substrate of similar thermal dilatation to synthesize diamond films, where the nanodiamond grains on the surface thereof serve as initiators.

A body produced according to the claimed method is also very promising for the synthesis of large diamond crystals or diamond ceramics under conditions of high static or dynamic pressures.

What is claimed is:

1. A method of producing a composite having a nanoporous body containing nanodiamonds and having a desired shape, comprising the steps of:

forming an intermediate body having the desired shape of nanodiamond particles having a maximum size of 10 nm, and wherein the intermediate body is formed with a porosity of 50–80 vol. %;

exposing said body to a gaseous hydrocarbon or a mixture of hydrocarbons at a temperature exceeding the decomposition temperature for the hydrocarbon or the hydrocarbons, and in that during the exposing of the intermediate body with hydrocarbon or hydrocarbons the mass of said body is increased by 50% at the most.

2. Method according to claim 1, wherein the forming of the intermediate body is made by pressing.

3. Method according to claim 1, wherein the forming of the intermediate body is made by slurry or slip casting.

4. Method according to claim 1, wherein the forming of the intermediate body is made by applying a diamond slip on the surface of a heat-proof support.

5. Method according to claim 3, wherein the slurry or slip, having a concentration of 3 to 40 weight % of nanodiamonds therein is used.

6. A nanoporous body comprising nanodiamond particles having a maximum size of 10 nm, a pyrocarbon skeleton and open pores, and the ratio of the mass of the pyrocarbon skeleton to the mass of the nanodiamond particles does not exceed 0.8.

7. A nanoporous body according to claim 6, wherein the volume of open pores constitutes more than 10% of the volume of the body.

8. Method according to claim 4, wherein the diamond slip having a concentration of 3 to 40 weight % of nanodiamonds therein is used.

9. The nanoporous body of claim 6 wherein said nanoporous body forms an electrode in a double electric layer capacitor.

10. The nanoporous body of claim 6 wherein said nanoporous body is a substrate for synthesizing of diamond films.

11. The nanoporous body of claim 6 wherein said nanoporous body is a base material for synthesizing of diamond crystals or diamond ceramics.

* * * * *